United States Patent
Chen et al.

(10) Patent No.: US 7,483,266 B2
(45) Date of Patent: Jan. 27, 2009

(54) MOUNTING APPARATUS FOR DATA STORAGE DEVICE

(75) Inventors: Yun-Lung Chen, Tu-Cheng (TW); Fa-Ming Jiang, Shenzhen (CN); Wu Long, Shenzhen (CN); Deng-Liang Guo, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 594 days.

(21) Appl. No.: 11/193,922

(22) Filed: Jul. 29, 2005

(65) Prior Publication Data

US 2006/0150206 A1 Jul. 6, 2006

(30) Foreign Application Priority Data

Dec. 30, 2004 (CN) ............ 2004 2 0103597 U

(51) Int. Cl.
*G06F 1/16* (2006.01)
(52) U.S. Cl. .................... 361/685; 720/600
(58) Field of Classification Search .......... 361/685; 720/600
See application file for complete search history.

(56) References Cited

U.S. PATENT DOCUMENTS

| | | | | |
|---|---|---|---|---|
| 5,269,698 A | * | 12/1993 | Singer | ............ 439/157 |
| 5,305,180 A | * | 4/1994 | Mitchell et al. | ............ 361/685 |
| 5,319,519 A | * | 6/1994 | Sheppard et al. | ............ 361/685 |
| 5,349,483 A | | 9/1994 | Tsai | ............ 360/97.01 |
| 5,721,669 A | * | 2/1998 | Becker et al. | ............ 361/685 |
| 5,825,616 A | * | 10/1998 | Howell et al. | ............ 361/684 |
| 6,456,491 B1 | * | 9/2002 | Flannery et al. | ............ 361/685 |
| 6,643,139 B2 | * | 11/2003 | Tien | ............ 361/727 |
| 6,667,879 B2 | * | 12/2003 | Salinas et al. | ............ 361/685 |
| 6,774,808 B1 | * | 8/2004 | Hibbs et al. | ............ 340/686.4 |
| 6,927,973 B2 | * | 8/2005 | Song et al. | ............ 361/685 |
| 2002/0093792 A1 | * | 7/2002 | Cheng | ............ 361/704 |
| 2006/0133029 A1 | * | 6/2006 | Cheng | ............ 361/685 |

FOREIGN PATENT DOCUMENTS

CN 98235030.9 11/1999
TW 389362 5/2001

* cited by examiner

*Primary Examiner*—Lisa Lea-Edmonds
(74) *Attorney, Agent, or Firm*—Morris Manning Martin LLP; Tim Tingkang Xia, Esq.

(57) ABSTRACT

A mounting apparatus for a data storage device includes a chassis (10), a data storage device (70) with a groove defined in a sidewall thereof, a supporting bracket (20) fixed to the chassis (10), an elastic tab (25) mounted to the supporting bracket (20), a connecting rod (30) movably attached to the supporting bracket (20) and a poke rod (40) pivotably mounted to the supporting bracket (20) and movably connected with the connecting rod (40). The supporting bracket (20) has a sidewall (22) with a rectangular hole (226) defined therein. The elastic tab (25) has a protrusion (256) extending through the rectangular hole (226) for engaging in the groove. The connecting rod (30) has a post (332) for urging the elastic tab (25) to move outwards. That the connecting rod (30) is pushed urges the data storage device (70) to retreat from the supporting bracket (20).

19 Claims, 4 Drawing Sheets

MOUNTING APPARATUS FOR DATA STORAGE DEVICE

BACKGROUND OF THE INVENTION

1. Field of the Invention

The present invention relates to a mounting apparatus, and more particularly to a mounting apparatus that demounts or mounts a data storage device conveniently.

2. Background of the Invention

Various data storage devices are installed in a computer enclosure for communication and dealing with data. Such a device may be, for instance, a hard disk drive, a CD-ROM/DVD-ROM drive, a CD-RW/DVD-RW drive or other similar devices. Nowadays, a computer enclosure is tightly packed in order to keep the size of the system small to fit on or under a desk. A conventional data storage device is directly attached to a computer enclosure with screws. However, the screws are usually very small, therefore making it difficult for a computer user to hold the screws in position while screwing them in with a screwdriver. The screws are inserted into holes which are on the data storage device assembly and on the chassis to which the data storage device assembly is being attached. The holes are difficult to align because they are also typically very small. Also, if the tolerances are incorrect due to manufacturing defects, the holes may not line up exactly, making it difficult to insert the screws. Obviously, using screws to attach the data storage device to a computer enclosure may be arduous due to requiring insertion of the screws. Both insertion and removal of the screws are time consuming and cumbersome owing to the work space restrictions and difficult accessibility.

In addition, it is more difficult to a disabled user with only one hand during the course of the operation of the data storage device. Understandably, some attempts have been taken to introduce a mounting apparatus for mounting a data storage device without screws and conveniently.

What is needed, therefore, is a mounting apparatus for a data storage device facilitating assembly and disassembly in a chassis.

SUMMARY

A mounting apparatus for a data storage device in accordance with a preferred embodiment of the present invention includes a chassis, a data storage device with a groove defined in a sidewall thereof, a supporting bracket fixed to the chassis, an elastic tab mounted to the supporting bracket, a connecting rod movably attached to the supporting bracket and a poke rod pivotably mounted to the supporting bracket and movably connected with the connecting rod. The supporting bracket has a sidewall with a rectangular hole defined therein. The elastic tab has a protrusion extending through the rectangular hole for engaging in the groove of the data storage device. The connecting rod has a post for urging the elastic tab to move outwards so that the protrusion disengages from the groove of the data storage device. The poke rod has a poking portion. That the connecting rod is pushed urges the poking portion to push the data storage device to retreat from the supporting bracket.

Other advantages and novel features of the present invention will be drawn from the following detailed description of preferred embodiment of the present invention with the attached drawings, in which:

DETAILED DESCRIPTION OF THE INVENTION

Figure 1:
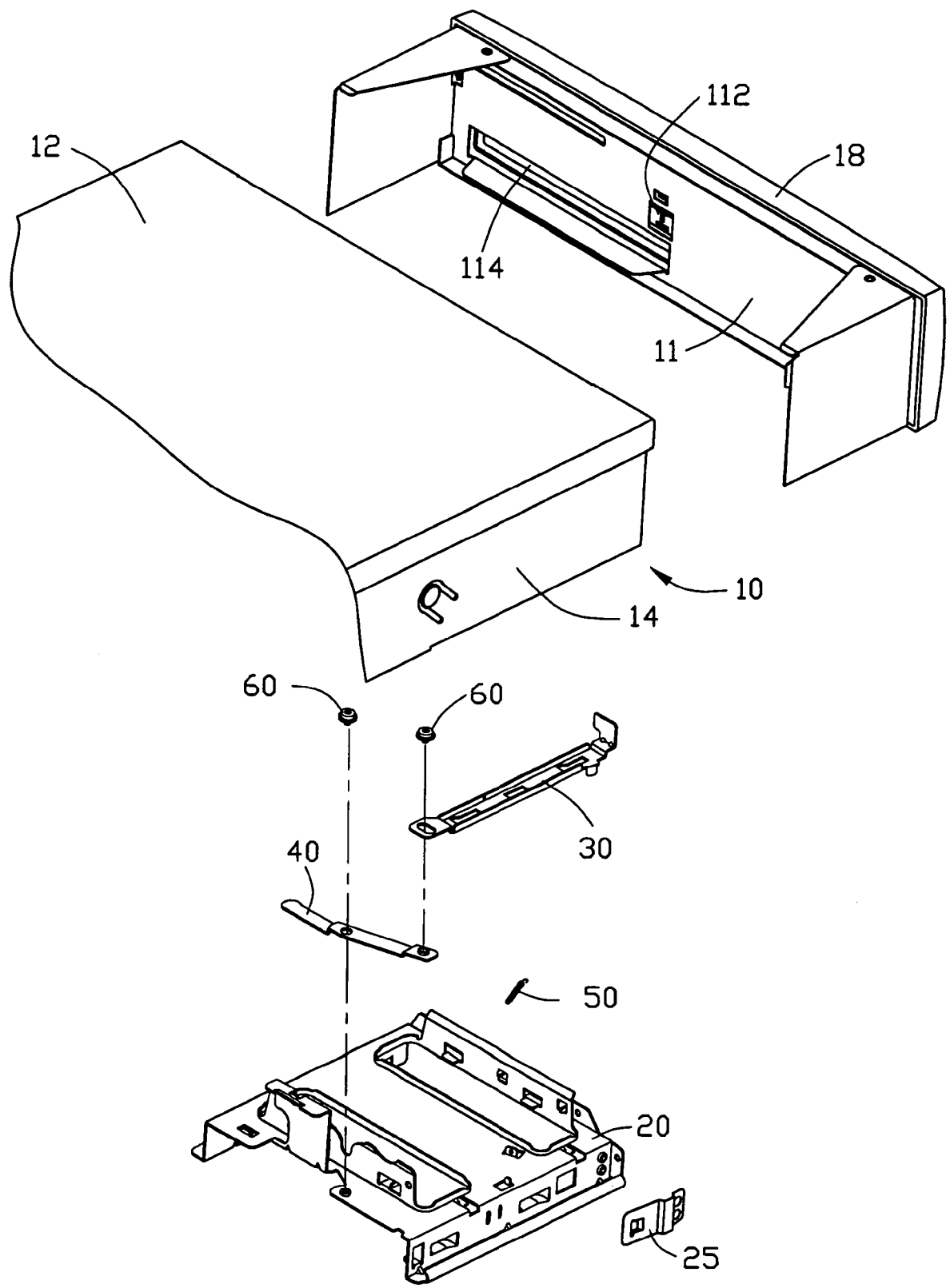
FIG. 1 is an exploded, isometric view of a mounting apparatus for a data storage device in accordance with a preferred embodiment of the present invention including a chassis, a connecting rod, a poke rod and a supporting bracket.

Referring to FIG. 1, a mounting apparatus for an electronic component like a data storage device of an electronic apparatus like a computer in accordance with a preferred embodiment of the present invention includes a chassis 10, a supporting bracket 20, a connecting rod 30, a poke rod 40 and a spring 50.

The chassis 10 includes a front panel 11, a bottom panel 12 and two side panels 14. A bezel 18 is mounted to the front panel 11 of the chassis 10. A rectangular hole 112 and an elongated opening 114 are defined in the front panel 11 thereof. An elongated opening 181 is defined in the bezel 18 corresponding to the opening 114 for entrance of a data storage device 70 (shown in FIG. 4). A keystroke 182 is disposed on the bezel 18 corresponding to the rectangular opening 112. A latch 184 (shown in FIG. 4) is movably mounted to the bezel 18 for preventing the keystroke 182 from moving inwards due to misoperation.

The data storage device 70 (shown in FIG. 4) may be a CD-ROM drive or other devices, such as a hard disk drive, a DVD-ROM drive, a CD-RW drive, a DVD-RW drive and so on. The data storage device 70 includes a sidewall (not labeled) and a rearwall (not labeled). A groove (not labeled) is defined in the sidewall thereof. A connector 72 (shown in FIG. 4) is disposed on the rearwall thereof.

Figure 2:
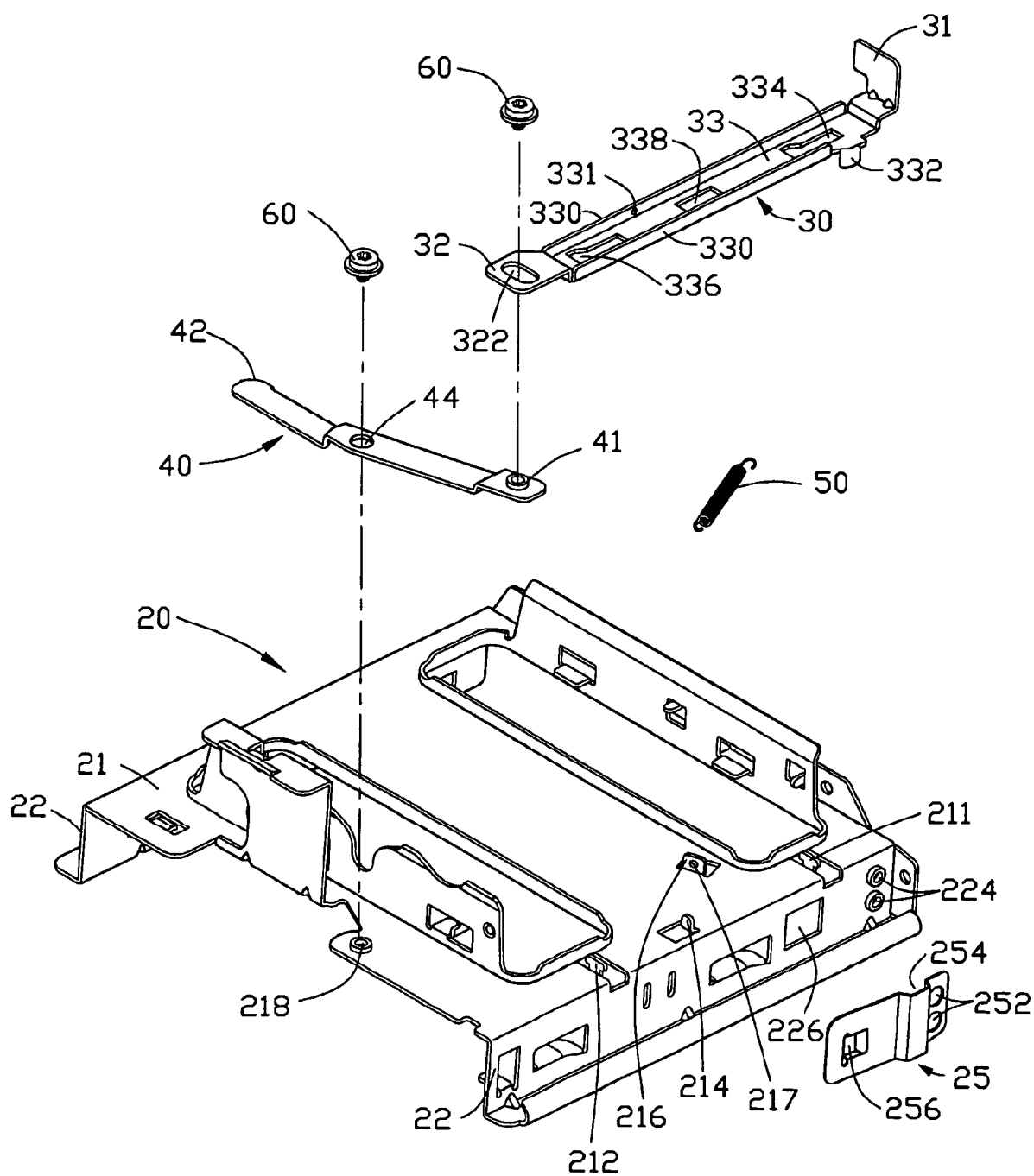
FIG. 2 is an enlarged, isometric view of a part of the members of FIG. 1.

Referring to FIG. 2, the supporting bracket 20 is fixed to the front panel 11 of the chassis 10. The supporting bracket 20 includes a bottom wall 21 and two sidewalls 22 extending vertically and upwardly from the bottom wall 21. Two T-shaped tabs 211,212 are formed on the bottom wall 21 adjacent to the sidewall 22 thereof. A stopping tab 214 is formed on the bottom wall 21 thereof between the two T-shaped tabs 211,212. A rectangular tab 216 with a through hole 217 defined is formed on the bottom wall 21 thereof adjacent to the stopping tab 214. A locating post 218 is formed at a rear end of the bottom wall 21. Two pillars 224 extend vertically and outwards from the sidewall 22 thereof. A rectangular hole 226 is defined in the sidewall 22 thereof. An elastic tab 25 is riveted to the supporting bracket 20. Two rivet holes 252 are defined on the elastic tab 25. The elastic tab 25 is riveted to the sidewall 22 of the supporting bracket 20 with the two pillars 224 extending through the two rivet holes 252. The elastic tab 25 is bent outwards to form a recess 254. A protrusion 256 for extending through the rectangular hole 226 is formed on the elastic tab 25.

The connecting rod 30 is slidably mounted to the supporting bracket 20. The connecting rod 30 is formed to have a pressed portion 31 at a front end and a pivoting portion 32 at a rear end thereof. A through hole 322 is defined in the pivoting portion 32. An arm 33 connects the pressed portion 31 and the pivoting portion 32. Two opposite sides of the arm 33 are bent vertically and upwardly to form two flanges 330. A circular aperture 331 is defined in the flange 330. The arm 33 is formed to have a post 332 at a front portion thereof. Two T-shaped openings 334,336 are defined in the arm 33. An elongated opening 338 is also defined in the arm 33 between the two T-shaped openings 334, 336.

The poke rod 40 is formed to have a locating post 41 at one end thereof. A poking portion 42 is formed at an opposite end thereof. A through hole 44 is defined in a middle portion of the poke rod 40, and a step (not labeled) is formed on the poke rod 40 in the middle portion beside the through hole 44.

Figure 3:
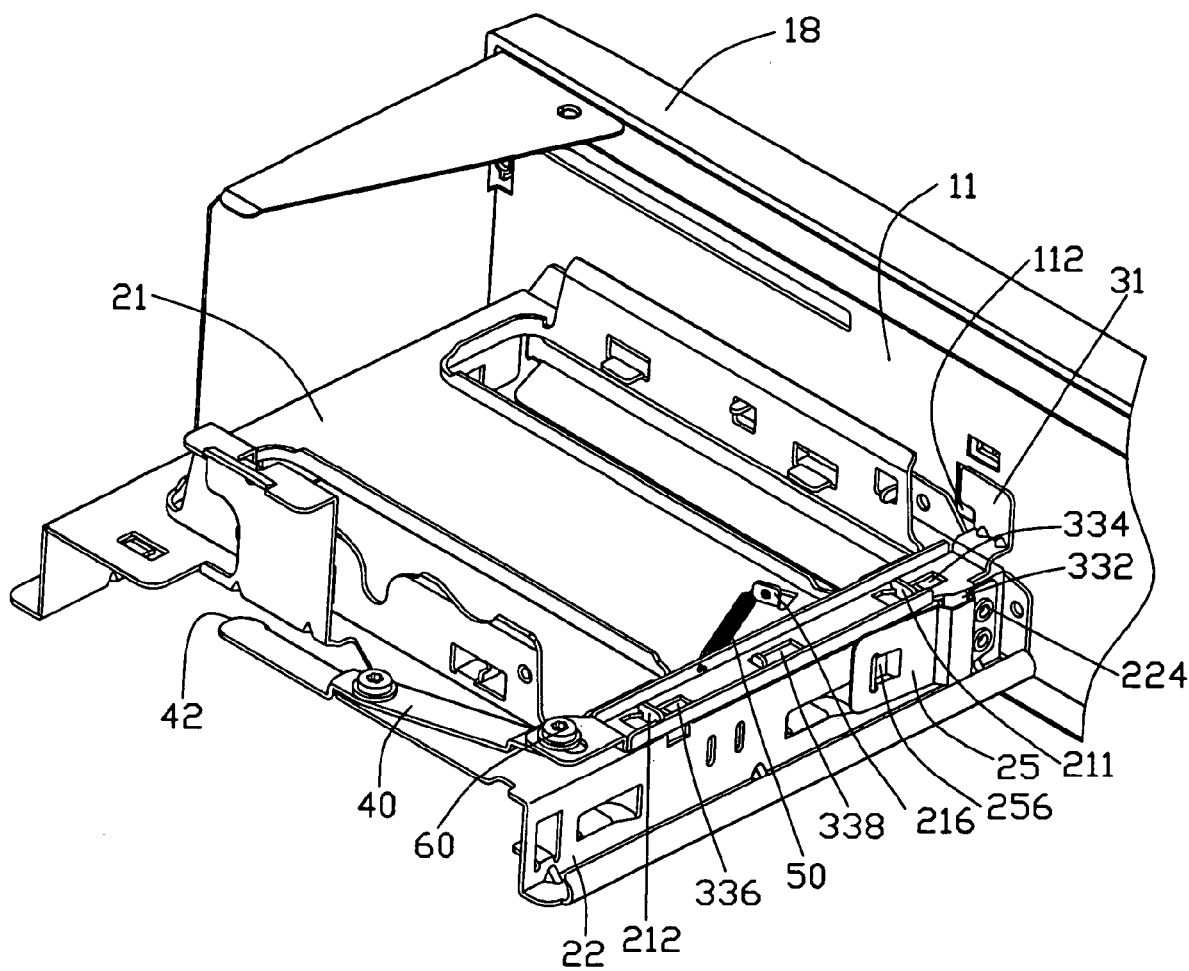
FIG. 3 is a pre-assembled isometric view of FIG. 2, but without the data storage device.
Figure 4:
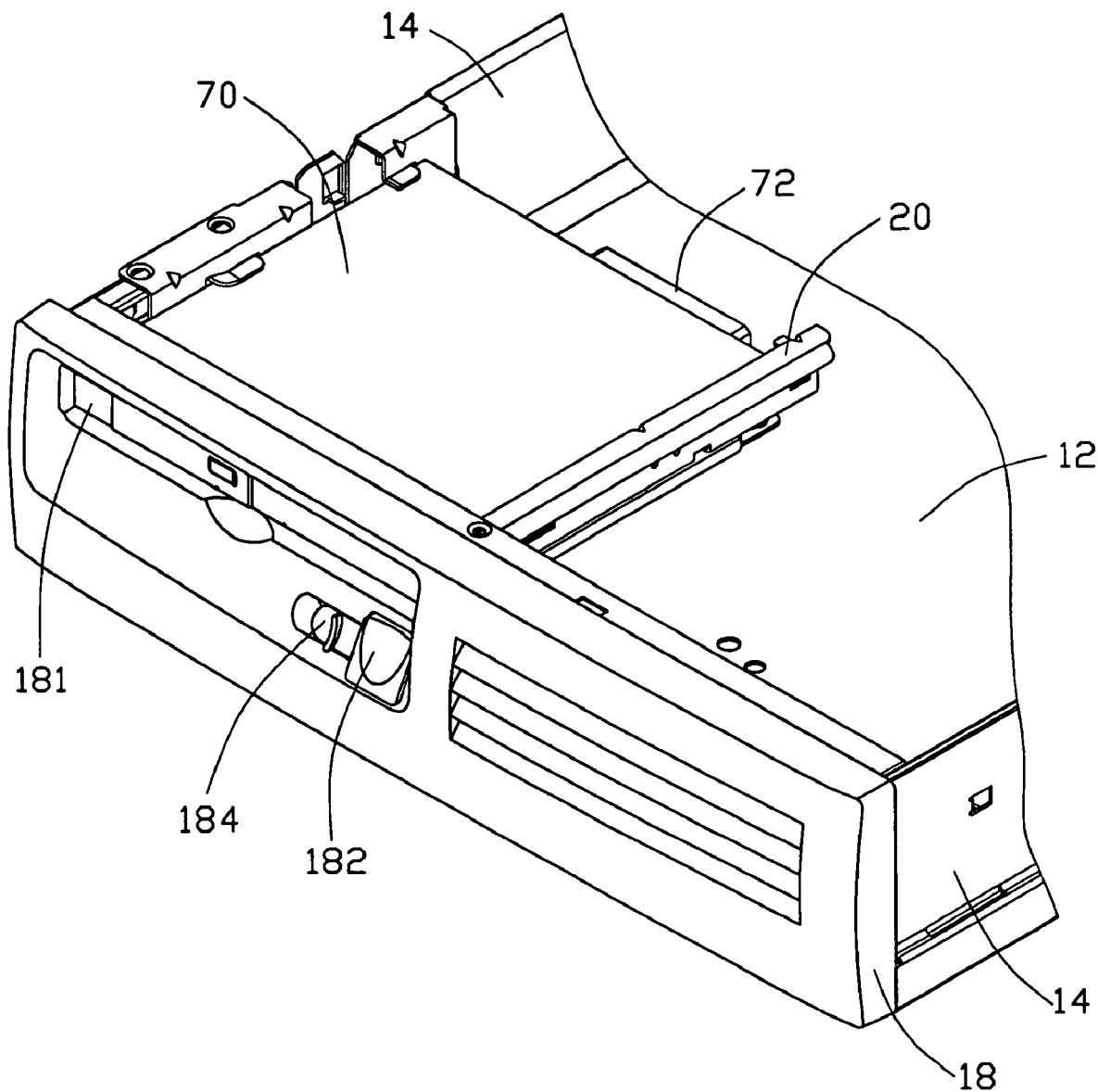
FIG. 4 is an assembled isometric view of FIG. 1, but viewed from another aspect.

Referring also to FIGS. 3 and 4, before the data storage device 70 is mounted to the chassis 10, one screw 60 extends through the through hole 322 of the connecting rod 30 and the locating post 41 of the poke rod 40 to pivotably connect the connecting rod 30 with the poke rod 40. The two T-shaped tabs 211,212 of the supporting bracket 20 extend through the broad portions of the two T-shaped openings 334,336, and then the two T-shaped tabs 211,212 of the supporting bracket 20 slide into the narrow portions of the two T-shaped openings 334,336. Simultaneously, the stopping tab 214 extends through the opening 338 of the connecting rod 30 for limiting the sliding range of the connecting rod 30. The pressed portion 31 of the connecting rod 30 extends through the rectangular opening 112 of the front panel 11 and abuts against the keystroke 182 of the bezel 18. The post 332 of the connecting rod 30 is received in the recess 254 of the elastic tab 25. The other screw 60 extends through the through hole 44 of the poke rod 40 and the locating post 218 of the supporting bracket 20 to pivotably secure the poke rod 40 on the supporting bracket 20. The poking portion 42 extends into the supporting bracket 20 at the rear thereof. Two opposite ends of the spring 50 connect the through hole 217 of the rectangular tab 216 of the supporting bracket 20 and the circular aperture 331 of the flange 330 of the connecting rod 30 respectively.

In assembly of the data storage device 70, firstly, the data storage device 70 is inserted in the supporting bracket 20 from the opening 181 of the bezel 18 until the rear of the data storage device 70 touches the poking portion 42 of the poke rod 40. Simultaneously, the connector 72 of the data storage device 70 contacts electrically to a connector (not shown) of a motherboard (not shown). Then, the protrusion 256 of the elastic tab 25 engages in the groove of (not shown) of the sidewall of the data storage device 70. Finally, the latch 184 is slid rightwards to prevent the keystroke 182 from being pressed inwards due to misoperation. Thus, the data storage device 70 is mounted to the chassis 10.

In disassembly of the data storage device 70, the latch 184 is slid leftwards to allow the keystroke 182 to move inwards. The keystroke 182 is pushed to drive the connecting rod 30 to move inwardly. Accordingly, the post 332 received in the recess 254 of the elastic tab 25 pushes the elastic tab 25 to move outwards. The protrusion 256 of the elastic tab 25 is drawn out of the groove of the sidewall of the data storage device 70. Simultaneously, the connecting rod 30 causes the poke rod 40 to pivot about the locating post 218 of the supporting bracket 20. The poking portion 42 of the poke rod 40 pushes the data storage device 70 so that the connector 72 of the data storage device 70 disengages from the connector of the motherboard. Finally, when the data storage device 70 extends through the opening 114 of the chassis 10 and the opening 181 of the bezel 18, the keystroke 182 is released. The connecting rod 30 and the poke rod 40 come back to an original position due to the spring 50. The data storage device 70 is thereby taken out from the chassis 10 easily.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative example shown and described.

We claim:

1. A data storage device assembly comprising:
   a data storage device;
   a supporting bracket for accommodating the data storage device, the supporting bracket having a sidewall with an elastic tab mounted, the elastic tab having a protrusion for locating the data storage device;
   a connecting rod movably attached to the supporting bracket, the connecting rod having a post for urging the elastic tab to move outwards, thereby disengaging the protrusion from the data storage device; and
   a poke rod pivotably mounted to the supporting bracket and movably connected with the connecting rod, the poke rod having a poking portion for moving the data storage device when the poke rod is caused to pivot by the connecting rod.

2. The data storage device assembly as recited in claim 1, wherein the data storage device assembly further comprises a spring connected between the supporting bracket and the connecting rod.

3. The data storage device assembly as recited in claim 1, wherein a hole is defined in the sidewall of the supporting bracket for the protrusion extending through to locating the data storage device.

4. The data storage device assembly as recited in claim 1, wherein the elastic tab is bent to form a recess for receiving the post of the connecting rod.

5. The data storage device assembly as recited in claim 1, wherein a locating post is formed at the bottom wall of the supporting bracket, and a through hole is defined in the poke rod for the locating post extending through so that the poke rod can pivot about the locating post.

6. The data storage device assembly as recited in claim 1, wherein a pivoting portion is formed on the connecting rod for movably connecting the poke rod.

7. The mounting apparatus as recited in claim 1, wherein the supporting bracket forms two generally T-shaped tabs at the bottom wall thereof, and two generally T-shaped openings are defined in the connecting rod for the two tabs extending through, thereby locating the connecting rod.

8. The data storage device assembly as recited in claim 1, wherein a bezel with a keystroke disposed thereon is securely attached to the supporting bracket, and the keystroke drives the connecting rod to move.

9. The data storage device assembly as recited in claim 8, wherein a latch is movably disposed on the bezel for preventing the keystroke from misoperation.

10. A mounting apparatus for a data storage device comprising:
    a chassis;
    a supporting bracket attached to the chassis, the supporting bracket having a bottom wall and a sidewall with an elastic tab mounted, a locating post is formed on the bottom wall thereof, the elastic tab having a protrusion for locating the data storage device;

a connecting rod movably attached to the supporting bracket, the connecting rod having a post for urging the elastic tab to move outwards, thereby causing the protrusion to disengage from the data storage device; and a poke rod adapted to movably connected with the connecting rod, the poke rod having a poking portion for urging the data storage device to retreat from the supporting bracket and a through hole for the locating post extending through for pivoting the poke rod.

11. The mounting apparatus for a data storage device as recited in claim 10, wherein the mounting apparatus further comprises a spring connected between the supporting bracket and the connecting rod.

12. The mounting apparatus for a data storage device as recited in claim 10, wherein a hole is defined in a sidewall of the supporting bracket for the protrusion extending through to locating the data storage device.

13. The mounting apparatus for a data storage device as recited in claim 10, wherein the elastic tab is bent to form a recess for receiving the post of the connecting rod.

14. The mounting apparatus for a data storage device as recited in claim 10, wherein a pivoting portion is formed on the connecting rod for movably connecting the poke rod.

15. The mounting apparatus for a data storage device as recited in claim 10, wherein the supporting bracket forms two generally T-shaped tabs at the bottom wall thereof, and two generally T-shaped openings are defined in the connecting rod for the two tabs extending through, thereby locating the connecting rod.

16. The mounting apparatus for a data storage device as recited in claim 10, wherein a bezel with a keystroke disposed thereon is securely mounted to the chassis, and the keystroke drives the connecting rod to move.

17. The mounting apparatus for a data storage device as recited in claim 16, wherein a latch is movably disposed on the bezel for preventing the keystroke from misoperation.

18. An electronic apparatus comprising:

a chassis enclosing said electronic apparatus;

an electronic component functioning for said electronic apparatus and movably installable into and out of said chassis, and an electrical connection between said electronic apparatus and said electronic component and a mechanical engagement between said chassis and said electronic component being established when said electronic component moves entirely in said chassis; and a connecting rod movably installed in said chassis beside said electronic component, said connecting rod accessibly controllable from an outside of said chassis and movable between said first position thereof where said connecting rod allow establishment of said electrical connection and mechanical engagement of said electronic component, and a second position thereof where said connecting rod is capable of forcing to disconnect said electrical connection and disable said mechanical engagement;

wherein said mechanical engagement is established by an elastic tab disposed beside said connecting rod and reachably engagable with said electronic component when said electronic component moves entirely in said chassis, and said connecting rod is reachable to said elastic tab for disabling said mechanical engagement between said elastic tab and said electronic component.

19. The electronic apparatus as recited in claim 18, wherein a poke rod is connectively engagable with said connecting rod so as to be forced by said connecting rod to disconnect said electrical connection.

* * * * *